(No Model.)  2 Sheets—Sheet 1.

G. F. C. KLOEPPINGER.
DEVICE FOR STEAMING FOOD FOR STOCK.

No. 411,525.  Patented Sept. 24, 1889.

WITNESSES  
Carroll J. Webster.  
Anna J. Lehaney.

INVENTOR  
George F. C. Kloeppinger  
By William Webster  
Atty (No Model.) 2 Sheets—Sheet 2.

G. F. C. KLOEPPINGER.
DEVICE FOR STEAMING FOOD FOR STOCK.

No. 411,525. Patented Sept. 24, 1889.

WITNESSES
Carroll J. Webster
Anna J. Lehaney

INVENTOR
George F. C. Kloeppinger
By William Webster
Atty

UNITED STATES PATENT OFFICE.

GEORGE F. C. KLOEPPINGER, OF TOLEDO, OHIO.

DEVICE FOR STEAMING FOOD FOR STOCK.

SPECIFICATION forming part of Letters Patent No. 411,525, dated September 24, 1889.

Application filed March 12, 1888. Serial No. 267,070. (No model.)

*To all whom it may concern:*

Be it known that I, GEORGE F. C. KLOEPPINGER, a citizen of the United States, residing at Toledo, in the county of Lucas and State of Ohio, have invented certain new and useful Improvements in a Device for Steaming Food for Stock; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to a device for steaming food for stock, and has especial reference to the furnace and water-receptacle and the means employed to insure safety in generating steam.

The invention consists in the peculiar and novel features of construction and arrangement of parts, as hereinafter described, and specifically pointed out in the claims.

Figure 1:
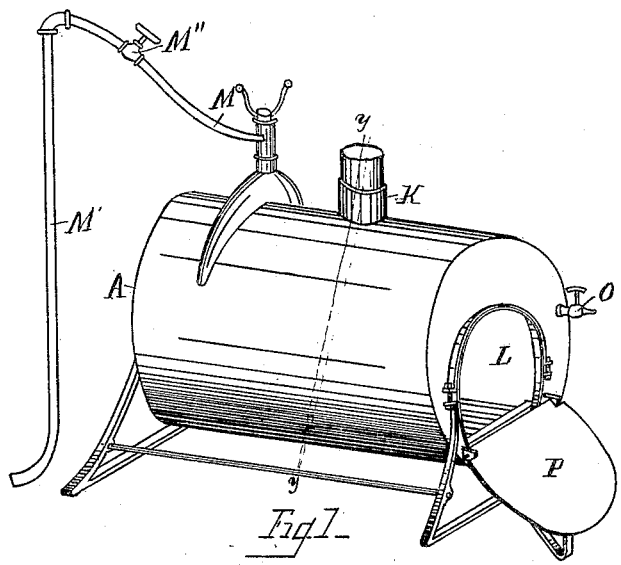
Figure 2:
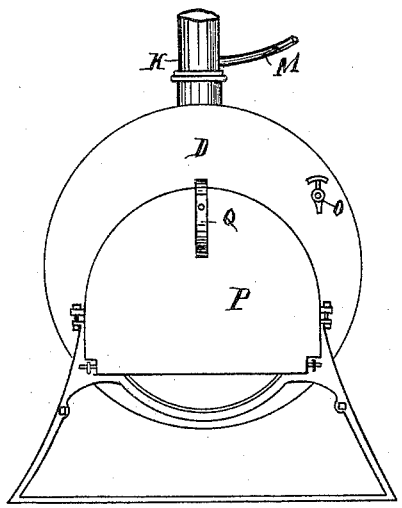
Figure 3:
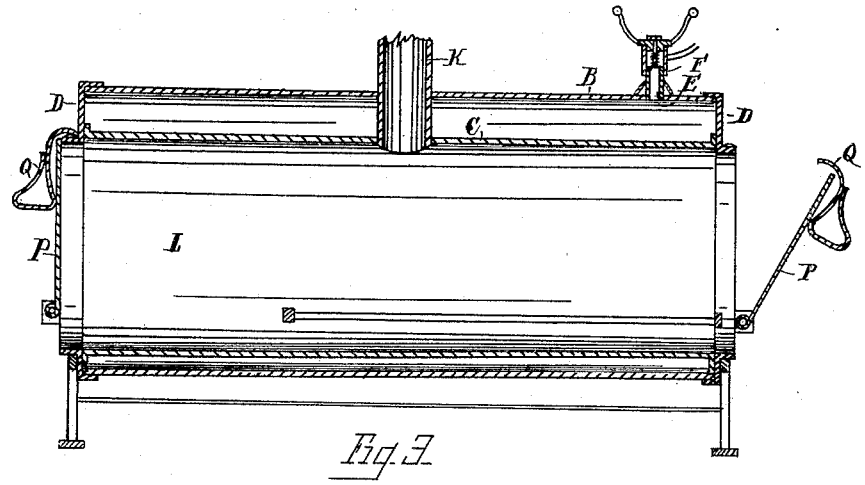
Figure 4:
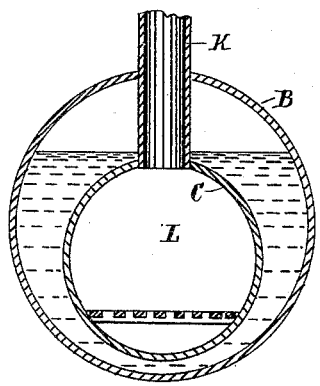
Figure 5:
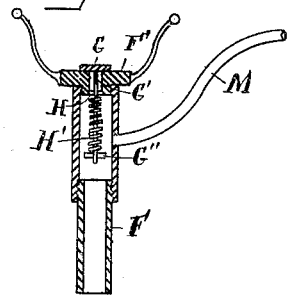

In the drawings, Figure 1 is a perspective view of a complete device. Fig. 2 is an elevation of the front end. Fig. 3 is a central vertical longitudinal section of the device. Fig. 4 is a transverse section on line $y\,y$, Fig. 1. Fig. 5 is a vertical longitudinal section through the center of the vertical pipe and safety-valve.

A designates the cylindrical boiler, formed of the outer shell B, the inner shell C, and head-circles D. The outer shell is perforated at E to receive a vertical pipe F, properly secured to the boiler, and at a point intermediate the length of pipe F is inserted a pipe M, having an upward incline for a short distance, at which point a downwardly-extending pipe M' is coupled by an ordinary pipe-coupling, which allows pipe M' to have lateral swing. Pipe M is provided with a cock M'', by which to open or close communication between the boiler and pipe M'. The upper end of pipe F is closed by a screw-plug F', which when removed affords a convenient means of filling the boiler with water. Plug F' is provided with a safety-valve G, having a stem G' threaded at the lower end, upon which is screwed nut G''.

H is a cross-bar formed in plug F', and through which stem G' passes.

H' is a coil-spring placed upon stem G' and bearing upon the under sill of bar H and the upper side of nut G'', by which means the tension of the spring can be adjusted and valve G seated to blow off at any desired pressure.

Centrally of the length of the boiler-shells B and C is inserted pipe K, leading from the interior of furnace L to the outer shell, and to which can be attached an extension of pipe to lead the smoke from the room in which the device is being used.

O is a gage-cock by which to determine the height of water in the boiler.

Furnace L is provided with grate-bars extending to a point back of the draft-flue, the remaining portion being left cylindrical to allow the insertion of an oil-burner or gas-pipe, if desired to use either as a fuel. The furnace is closed at each end by hinged doors P, each door being provided with a combined leg and spring-catch Q, composed of a single piece of metal having a portion at right angles to the door a sufficient distance to form a leg, and from thence curved to connect with a catch portion formed of a free end extending over the door, and in position to catch a lug upon the boiler-head.

In operation screw-plug F' is removed and the boiler filled with water. The plug is then replaced, cock M'' is closed and a fire built within the furnace, and the boiler being entirely filled with water, steam is quickly generated for use in steaming or cooking the food, which may be placed in any convenient receptacle and the end of pipe M' inserted, steam being admitted by opening cock M''. Should too great pressure of steam be raised in the boiler through carelessness of the attendant, it finds its escape through valve G, thereby obviating any fracture to the boiler or danger to the attendant—a feature of great value in an organized apparatus of this character, being designed for use principally among that class the least familiar with the management of steam.

What I claim is—

1. In a device for steaming food, the combination, with the boiler A, of the filling-pipe F, connected therewith, a spring safety-valve connected to the filling-pipe, said safety-valve consisting of the screw-plug F', formed with the cross-bar H, valve-disk G, stem G', threaded at its lower end to receive the nut G", and a coil-spring H', surrounding the stem and bearing upon the under side of the bar H and upper side of nut G", and the steam-pipe M, connected to the pipe F at a point intermediate the length of the same, substantially as and for the purpose set forth.

2. In a device for steaming food, a furnace, doors to the openings thereof having a spring-catch and leg formed of a single piece of metal, formed with a horizontal portion to support the door when open, and a vertical portion to hold the same closed, as and for the purpose set forth.

In testimony that I claim the foregoing as my own I hereby affix my signature in presence of two witnesses.

GEORGE F. C. KLOEPPINGER.

Witnesses:
WILLIAM WEBSTER,
CARROLL J. WEBSTER.